US012791980B2

(12) United States Patent
Cusin et al.

(10) Patent No.: US 12,791,980 B2
(45) Date of Patent: Nov. 10, 2026

(54) DISENGAGEABLE WINDING DEVICE, IN PARTICULAR FOR A HOROLOGICAL BARREL, PROVIDED WITH A SLIDING WINDING GEAR TRAIN

(71) Applicant: Nivarox-FAR S.A., Le Locle (CH)

(72) Inventors: Pierre Cusin, Villars-Burquin (CH); Laurent Jeanneret, Villers-le-Lac (FR)

(73) Assignee: NIVAROX-FAR S.A., Le Locle (CH)

( * ) Notice: Subject to any disclaimer, the term of this patent is extended or adjusted under 35 U.S.C. 154(b) by 321 days.

(21) Appl. No.: 18/516,483

(22) Filed: Nov. 21, 2023

(65) Prior Publication Data

US 2024/0184248 A1 Jun. 6, 2024

(30) Foreign Application Priority Data

Dec. 1, 2022 (EP) .................................... 22210934

(51) Int. Cl.
*G04B 9/02* (2006.01)
*G04B 1/20* (2006.01)
*G04B 13/00* (2006.01)

(52) U.S. Cl.
CPC ................ *G04B 9/02* (2013.01); *G04B 1/20* (2013.01); *G04B 13/00* (2013.01)

(58) Field of Classification Search
CPC ........................................................ G04B 1/20
See application file for complete search history.

(56) References Cited

U.S. PATENT DOCUMENTS

| | | | | | |
|---|---|---|---|---|---|
| 2,632,993 | A * | 3/1953 | Hill | .......................... | G04B 1/20 968/36 |
| 3,264,819 | A | 8/1966 | Konrad | | |
| 3,878,673 | A | 4/1975 | Meitinger | | |
| 10,222,745 | B2 | 3/2019 | Calame et al. | | |
| 2007/0242568 | A1 | 10/2007 | Goeller | | |
| 2011/0299366 | A1 | 12/2011 | Giacobino | | |

FOREIGN PATENT DOCUMENTS

| | | | | |
|---|---|---|---|---|
| CH | 18 065/68 | A4 | 8/1971 | |
| CH | 708340 | A2 * | 1/2015 | ........... G04B 11/006 |
| FR | 1 207 713 | A | 2/1960 | |
| JP | 49-106858 | | 10/1974 | |
| JP | 2007-0286056 | A | 11/2007 | |
| JP | 2012-32299 | A | 2/2012 | |

OTHER PUBLICATIONS

European Search Report 22210934 filed Apr. 26, 2023.

* cited by examiner

*Primary Examiner* — Renee S Luebke
*Assistant Examiner* — Matthew Daniel Hwang
(74) *Attorney, Agent, or Firm* — Sughrue Mion, PLLC

(57) ABSTRACT

A disengageable winding device (1) for a barrel (2) provided with a spring, comprising a ratchet (3) mounted on a winding arbor such that it is rigidly connected thereto, the winding arbor being an arbor for winding the barrel (2), the rotation of which winds up the barrel (2), and a winding gear train (40) meshing with the ratchet (3), the rotation of the winding gear train (40) driving the rotation of the ratchet (3) and that of the winding arbor.

10 Claims, 3 Drawing Sheets

DISENGAGEABLE WINDING DEVICE, IN PARTICULAR FOR A HOROLOGICAL BARREL, PROVIDED WITH A SLIDING WINDING GEAR TRAIN

CROSS REFERENCE TO RELATED APPLICATIONS

This application claims priority to European Patent Application No. 22210934.0 filed Dec. 1, 2022, the entire contents of which are incorporated herein by reference.

TECHNICAL SCOPE OF THE INVENTION

The invention relates to a disengageable winding device, in particular for a horological barrel, provided with a sliding winding gear train.

The invention further relates to a horological movement comprising such a disengageable winding device.

TECHNOLOGICAL BACKGROUND

Most of today's self-winding mechanical watches typically comprise an oscillating weight driving a gear train by gravity, the rotation of which tightens a strip-spring, i.e. the mainspring, wound in a drum around an arbor, by the driving of said arbor. Rotation is typically forced in one direction only, and is prevented from reversing by a pawl.

However, when the spring is fully wound, it is important to avoid over-winding, which could cause the spring to break, or the oscillator to rebound, during which the amplitude of oscillation increases to the point where the balance abuts against the horns of the pallet-lever, causing the rate to drift due to the balance rebounding against these bankings.

To avoid these risks, such barrels typically have a system for limiting the tightening of the mainspring.

This limitation is typically achieved by the outer last strip of the spring sliding against the inner wall of the drum. When the spring is fully tightened and wound around the winding arbor of the barrel, the last wound coil presses against the outer wall of the drum.

Thus, when the tightening torque exceeds the friction torque against the wall of the last coil, the latter starts to slide. To prevent uncontrolled sliding, notches allow the end of the strip to stop sliding as soon as the tightening torque has dropped sufficiently.

However, the drawback of such a system lies in the sliding-friction process of the last coil inside the drum. Indeed, when the mechanism to be driven requires a high torque, the bearing forces and the friction between the strip of the spring and the wall are accentuated, leading to wear and a deterioration in the performance of the barrel, even in the presence of grease, which is ultimately removed from the friction band after a certain time.

Moreover, in an automatic barrel, contradictory criteria must be satisfied in order to maximise efficiency, such as reduced friction between the coils, and high friction between the spring and the drum to guarantee a good tightening torque.

Drum deterioration must also be avoided, such as any tearing away of the coating, build-up of sludge and wear on the walls from the pressure of the fully tightened strip of the spring.

SUMMARY OF THE INVENTION

The aim of the present invention is to overcome all or some of the above-mentioned drawbacks by providing a winding device provided with a system for limiting the tightening of a spring, which replaces a system based on the sliding of a strip against notches in an internal wall of the drum.

To this end, the invention relates to a disengageable winding device, in particular for a barrel provided with a spring, comprising a ratchet mounted on a winding arbor such that it is rigidly connected thereto, the winding arbor being, for example, a barrel-winding arbor, the rotation of which winds up the barrel, and a winding gear train meshing with the ratchet, the rotation of the winding gear train driving the rotation of the ratchet and that of the winding arbor, the winding device comprising an actuating wheel set for actuating the winding gear train by applying a torque to the winding gear train, the actuating wheel set meshing with the winding gear train in an engaged position.

The invention is noteworthy in that the winding gear train is mounted so that it can slide out of the engaged position when the torque applied to the winding gear train is substantially greater than a threshold value, in particular when the barrel is fully wound up.

This allows the winding gear train to move out of the engaged position, so that the ratchet is no longer driven by the winding gear train. Indeed, the winding gear train is no longer meshed by the actuating wheel set. For example, when the torque applied to the winding gear train by the actuating wheel set is too high, in particular when the barrel is fully wound up, the winding gear train slides and no longer transmits the rotation torque to the ratchet, so that the ratchet no longer rotates.

Thanks to the invention, the risks of premature wear of the barrel are avoided, as the limiting device is arranged upstream of and outside the barrel. Moreover, there is no need to use conventional winding limitation devices based on the spring rubbing inside the barrel.

According to a particular embodiment of the invention, the winding gear train and the actuating wheel set are superimposed.

According to a particular embodiment of the invention, the actuating wheel set is mounted such that it is rigidly connected to said rotary arbor.

According to a particular embodiment of the invention, the actuating wheel set does not mesh with the winding gear train when the winding gear train is sliding.

According to a particular embodiment of the invention, the winding device comprises return means exerting an axial return force on the winding gear train in the direction of the actuating wheel set, to hold it in the engaged position.

According to a particular embodiment of the invention, the return means comprise a spring arranged above the winding gear train.

According to a particular embodiment of the invention, the winding gear train slides when the torque applied to the winding gear train generates an axial force greater than and opposing the force exerted by the return means.

According to a particular embodiment of the invention, the actuating wheel set and the winding gear train each comprise wolf-tooth toothing, the two wolf-tooth toothings cooperating with each other.

The invention further relates to a horological movement comprising a barrel, the horological movement comprising such a disengageable winding device for the barrel.

BRIEF DESCRIPTION OF THE FIGURES

The purposes, advantages and features of the present invention will become apparent after reading several embodiments, which are provided for purposes of illustration only and not intended to limit the scope of the invention, given with reference to the accompanying drawings, in which.

DETAILED DESCRIPTION OF THE INVENTION

Figure 1:
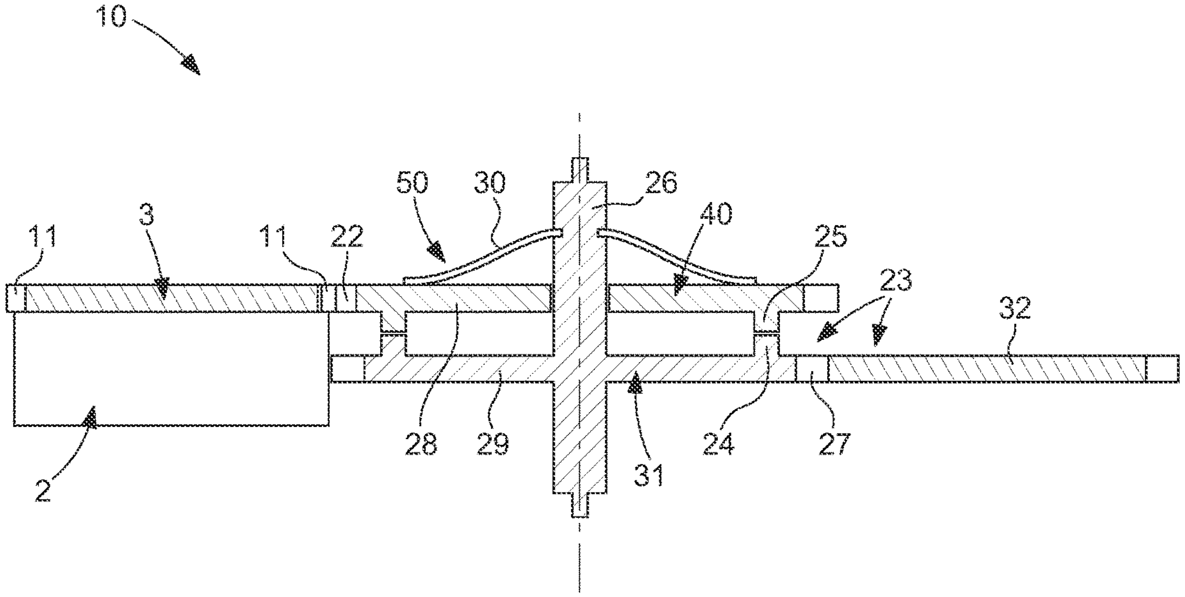
FIG. 1 is a diagrammatic, sectional view of a disengageable winding device according to one embodiment of the invention, which device is in the engaged position.

FIGS. 1 to 5 show an embodiment of a winding device 10, in this case a horological barrel 2, according to the invention.

The winding device 10 of the barrel 2 comprises a ratchet 3 and a winding gear train 40. The winding gear train 40 meshes with the ratchet 3, so that when the winding gear train 40 is rotated in a first direction, the ratchet 3 rotates in a second direction opposite to the first direction.

The ratchet 3 is mounted on a winding arbor such that it is rigidly connected thereto, the winding arbor allowing the barrel 2 to be wound up. The winding arbor is preferably cylindrical.

In the example, the winding arbor is the winding arbor of the barrel 2, the ratchet 3 being arranged on the barrel 2. The ratchet 3 comprises a hub 7 mounted on the winding arbor such that it is rigidly connected thereto.

In one alternative embodiment, not shown in the figures, the winding arbor is not mounted on the barrel, the winding arbor comprising a pinion meshing with a wheel set driving the barrel-winding arbor in order to tighten the spring, if the ratchet is not mounted on the barrel.

The winding gear train 40 is arranged next to the ratchet 3, and preferably extends in the same plane as the ratchet 3.

The ratchet 3 comprises a first external toothing 11 distributed around the ratchet 3. The first toothing 11 cooperates with a second peripheral toothing 22 arranged on a first wheel 28 of the winding gear train 40. The winding gear train 40 comprises a third toothing 25 arranged under the first wheel.

The barrel 2 comprises a balance spring (not shown in the figures), arranged inside the barrel 2, which must be tightened, either by a self-winding system or by a manual winding system.

To this end, the winding device 1 further comprises a gear system 23, for example driven by a self-winding weight (not shown in the figures) of the horological movement. The gear train system 23 can also be driven by a winding stem (not shown in the figures) that can be actuated by means of a winding button, in the case of manual winding.

An actuating wheel set 31 for the winding of the gear train system 23 actuates the winding gear train 40. The actuating wheel set 31 comprises a second wheel 29 provided with a fourth peripheral toothing 27 cooperating with another wheel set 32 of the gear train system 23. The actuating wheel set 31 comprises a fifth toothing 24 arranged on the second wheel 29, and meshing with the third toothing 25 of the winding gear train 40 in the engaged position.

Thus, by actuating the gear train system 23, a torque is applied to the ratchet 3, which transmits it, at least in part, to the winding arbor, via the winding gear train 40 driven by the actuating wheel set 31.

The rotation of the actuating wheel set 31 and of the winding gear train 40 causes the ratchet 3, and thus the winding arbor, to rotate when the barrel 2 is wound.

To avoid over-winding the barrel 2, the winding gear train 40 is capable of moving from an engaged position in which it drives the ratchet 3.

In this embodiment, the disengageable winding device 10 comprises a rotary arbor 26, on which the winding gear train 40 is slidably mounted around said rotary arbor 26. The actuating wheel set 31 is mounted on the rotary arbor 26 such that it is rigidly connected thereto.

The winding gear train 40 meshes with the winding actuating wheel set 31 when it is in the engaged position, and does not mesh with the winding actuating wheel set 31 when it is sliding along the rotary arbor 26.

Thus, in the engaged position, the actuating wheel set 31 drives the winding gear train 40, and the winding gear train 40 drives the ratchet 3.

Whereas, after the winding gear train 40 has finished sliding, the actuating wheel set 31 rotates idly and does not drive the winding gear train 40, which is at a distance from the actuating wheel set 31. The ratchet 3 is thus no longer driven by the winding gear train 40.

The winding gear train 40 and the actuating wheel set 31 are superimposed, one on top of the other. The winding gear train 40 is arranged above the actuating wheel set 31, so that the fifth toothing 24 of the actuating wheel set 31 cooperates with the third toothing 25 of the winding gear train 40 in the engaged position.

The third toothing 25 and the fifth toothing 25 preferably have wolf-tooth-shaped teeth. In other words, one side of each tooth is less inclined than the other side. This makes it easier for the toothings to slide over each other in a preferred direction of rotation if they are not held sufficiently pressed against each other.

The winding gear train 40 can slide axially along the axis of the rotary arbor 26. Thus, the winding gear train 40 can move axially from the engaged position and vice-versa.

In the engaged position, the winding gear train 40 and the actuating wheel set 31 are in contact via the third toothing 25 and the fifth toothing 24, which mesh with each other. Thus, the actuating wheel set 31 drives the winding gear train 4, and thus the ratchet 3.

However, in the disengaged configuration, the winding gear train 40 and the actuating wheel set 31 are further apart, so that the third toothing 25 and the fifth toothing 24 do not mesh with each other. As a result, the actuating wheel set 31 does not drive the winding gear train 4 or the ratchet 3.

Moreover, the second toothing 22 of the winding gear train 40 no longer meshes with the first toothing 11 of the ratchet 3, when the winding gear train 40 is disengaged. More specifically, as the winding gear train 40 has slid along the rotary arbor 26, the second toothing 22 has shifted beyond the first toothing 11.

The winding device 40 further comprises return means 50 exerting an axial return force on the winding gear train 40 in the direction of the actuating wheel set 31, to hold it in the engaged position.

The return means comprise a spring 30 arranged above the winding gear train 40.

The winding gear train 40 is mounted on the spring 30, which exerts an axial force on the winding gear train 40 to hold it in the engaged position.

The spring 30 takes the form of a flexible collar joined to the rotary arbor 26 above the winding gear train 40. The flexible collar is bent or folded over the winding gear train 40 to press thereagainst.

The flexible collar exerts an axial return force on the winding gear train 40 in the direction of the actuating wheel set 31, so that the third toothing 25 and the fifth toothing 24 cooperate in the engaged position.

Moreover, the winding gear train 40 slides around the winding arbor 26 when the torque applied to the winding gear train 40 generates an axial force which is opposite to and greater than the force exerted by the return means 50.

More specifically, thanks to the wolf-tooth-shaped teeth of the third toothing 25 and of the fifth toothing 24, the torque applied to the winding gear train 40 generates a force that pushes the winding gear train 40 in the opposite direction to the force produced by the spring 30.

Thus, when the torque substantially exceeds a threshold value, the winding gear train 40 slides around the rotary arbor 26 to leave the engaged position. The winding gear train 40 slides by performing a substantially rectilinear axial movement around the rotary arbor 26 from the engaged position to a certain distance from the actuating wheel set 31.

Above the threshold value, when the torque required to rotate the ratchet 3 is greater than that required to unfold the flexible collar 26 upwards, the winding gear train 40 is pushed by the actuating wheel set 31 thanks to the third toothing 25 and the fifth toothing 24, in particular thanks to the wolf-tooth toothings 24, 25.

In other words, when the actuating wheel set 31 presses hard on the winding gear train 40, the third wolf-tooth toothing 25 and the fifth wolf-tooth toothing 24 slide over each other without meshing and the winding gear train 40 moves as the flexible collar extends upwards along the rotary arbor 26.

As a result, the actuating wheel set 31 continues to rotate, but the winding gear train 40 and the ratchet 3 no longer rotate.

Figure 3:
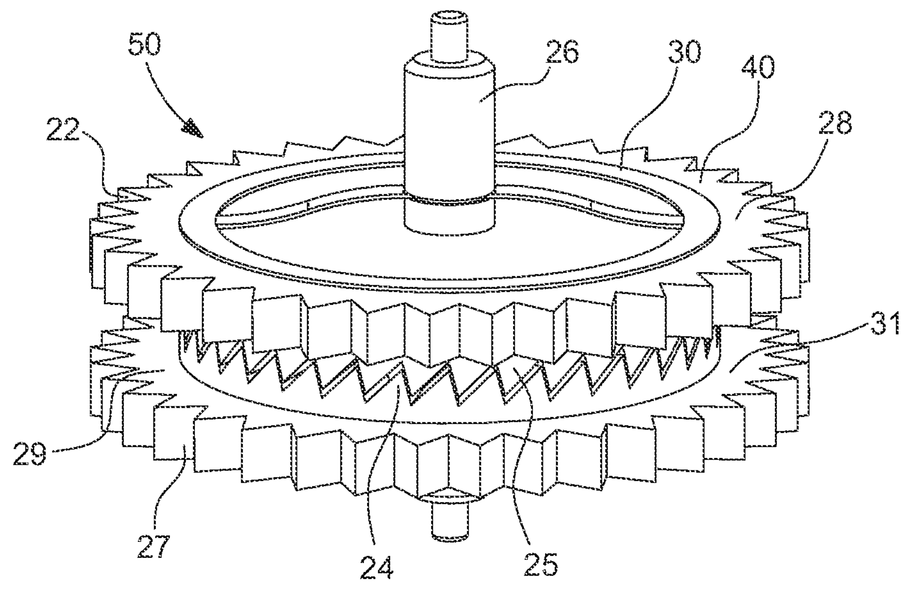
FIG. 3 is a diagrammatic, perspective view of the disengageable winding device according to the embodiment of the invention shown in FIG. 1, which device is in the engaged position.

In FIGS. 1 and 3, in the winding configuration, the winding torque exerted on the winding gear train 40 by the actuating wheel set 31 is less than the threshold value, so that the flexible collar does not change shape. The first toothing 12 and the ratchet 3 are thus driven by the winding gear train 40.

Figure 2:
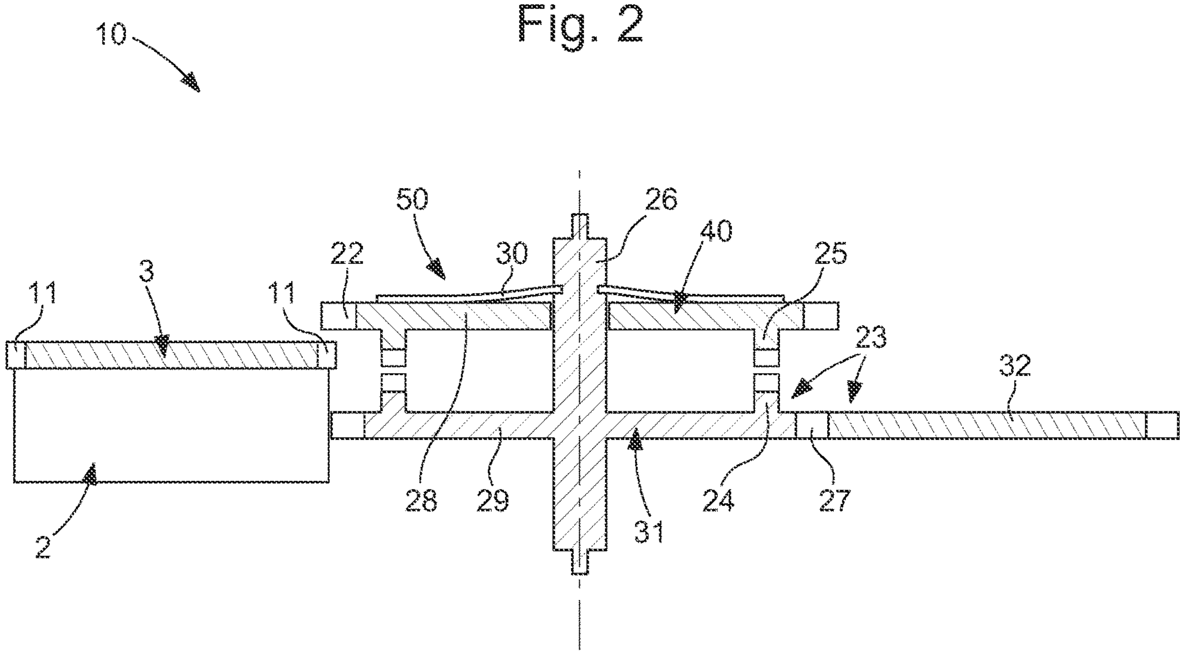
FIG. 2 is a diagrammatic, sectional view of the disengageable winding device according to the embodiment of the invention shown in FIG. 1, which device is disengaged.
Figure 4:
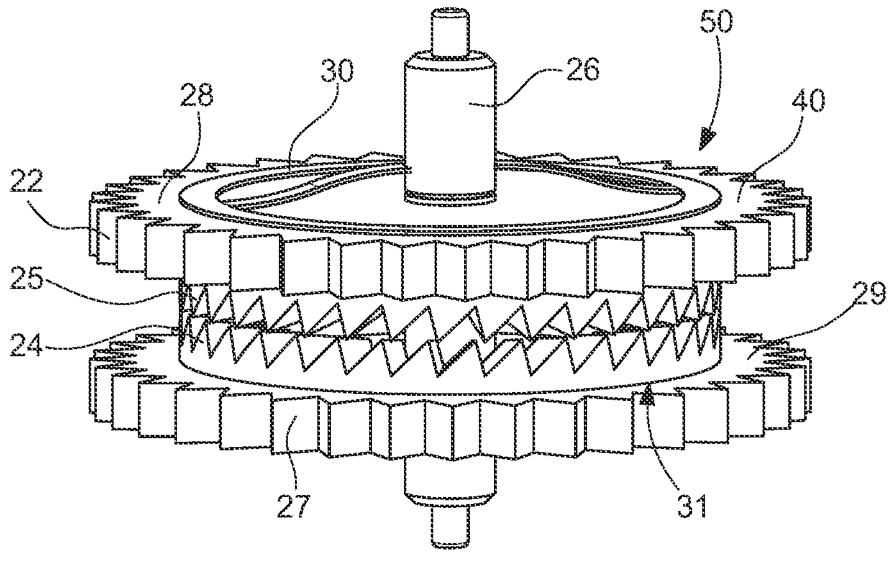
FIG. 4 is a diagrammatic, perspective view of the disengageable winding device according to the embodiment of the invention shown in FIG. 1, which device is disengaged, in particular when the mainspring is fully tightened.
Figure 5:
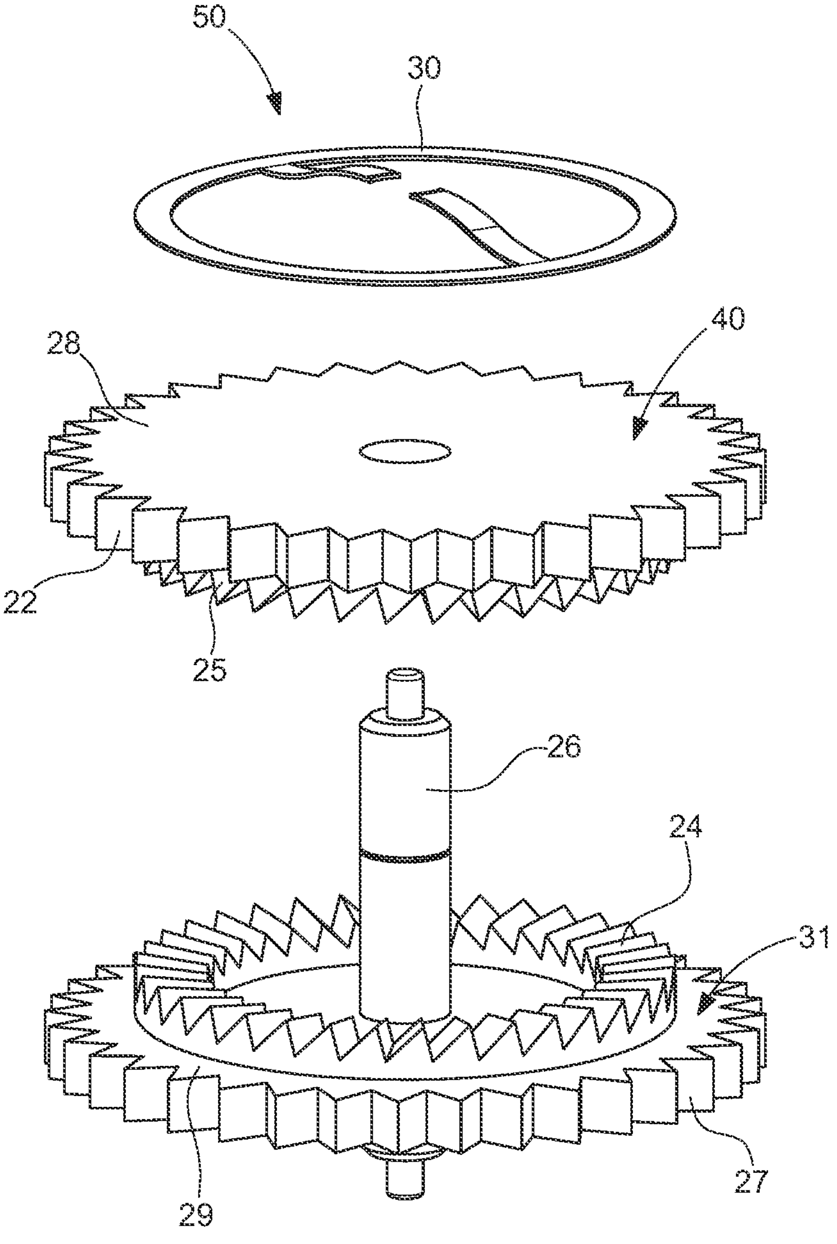
FIG. 5 is a diagrammatic, exploded, perspective view of the disengageable winding device according to the embodiment of the invention shown in FIG. 1.

In FIGS. 2 and 4, when the barrel 2 is fully wound, the winding torque exerted on the winding gear train 40 by the actuating wheel set 31 is greater than the threshold value, so that the flexible collar unfolds and the winding gear train 40 moves upwards. In other words, the torque required to rotate the ratchet 3 is too great for the flexible collar, which cannot retain its initial shape.

These disengagement means protect the barrel 2 from being over-wound and prevent premature wear inside the barrel 2. The winding arbor can thus be blocked when the mainspring is fully tightened, without risking breaking the mainspring 2.

The barrel 2 further comprises a sixth peripheral toothing 18 configured to cooperate with a seventh toothing of a wheel set of the horological movement. The wheel set is, for example, a third wheel. Once wound, the barrel 2 supplies the energy required to operate the horological movement via the wheel set.

The invention further relates to a horological movement, not shown in the figures, the movement comprising a barrel and a barrel-winding device as described above.

It goes without saying that the invention is not limited to the embodiments described with reference to the figures and alternatives can be considered without leaving the scope of the invention.

The invention claimed is:

1. A disengageable winding device (10) for a barrel (2) provided with a spring, comprising:
- a ratchet (3) mounted on a winding arbor and rigidly connected thereto, the winding arbor being an arbor for winding the barrel (2), the rotation of which winds up the barrel (2),
- a winding gear train (40) meshing with the ratchet (3) in an engaged position, the rotation of the winding gear train (40) driving the rotation of the ratchet (3) and that of the winding arbor, and
- an actuating wheel set (31) for driving the winding gear train (40) by applying a torque to the winding gear train (40), the actuating wheel set (31) meshing with the winding gear train (40) in the engaged position, the winding gear train (40) being mounted to slide about a rotary arbor (26) out of the engaged position so as to be disengaged from the ratchet (3) and from the actuating wheel set (31) when the torque applied to the winding gear train (40) is substantially greater than a threshold value when the barrel (2) is fully wound up.

2. The winding device according to claim 1, wherein the winding gear train (40) and the actuating wheel set (31) are superimposed in the engaged position.

3. The winding device according to claim 1, wherein the actuating wheel set (31) is mounted on said rotary arbor (26) and rigidly connected thereto.

4. The winding device according to claim 1, wherein the actuating wheel set (31) does not mesh with the winding gear train (40) when the winding gear train (40) is sliding.

5. The winding device according to claim 1, further comprising return means (50) exerting an axial return force on the winding gear train (40) in the direction of the actuating wheel set (31), to hold in the engaged position.

6. The winding device according to claim 5, wherein the return means comprise a spring (30) arranged above the winding gear train (40).

7. The winding device according to claim 5, wherein the winding gear train (40) slides when the torque applied to the winding gear train (40) generates an axial force which is opposite to and greater than the force exerted by the return means (50).

8. A horological movement comprising the barrel (2) and the winding device (10) for winding the barrel (2) according to claim 1.

9. A disengageable winding device (10) for a barrel (2) provided with a spring, comprising:
- a ratchet (3) mounted on a winding arbor and rigidly connected thereto, the winding arbor being an arbor for winding the barrel (2), the rotation of which winds up the barrel (2),
- a winding gear train (40) meshing with the ratchet (3), the rotation of the winding gear train (40) driving the rotation of the ratchet (3) and that of the winding arbor, and
- an actuating wheel set (31) for driving the winding gear train (40) by applying a torque to the winding gear train (40), the actuating wheel set (31) meshing with the winding gear train (40) in an engaged position, the winding gear train (40) being mounted to slide about a rotary arbor (26) out of the engaged position when the torque applied to the winding gear train (40) is substantially greater than a threshold value when the barrel (2) is fully wound up, wherein the actuating wheel set (31) and the winding gear train (40) each comprise a wolf-tooth toothing (24, 25), the two wolf-tooth toothings (24, 25) cooperating with each other.

10. The winding device according to claim 9, wherein the winding gear train (40) and the actuating wheel set (31) each comprise a second radial toothing (22, 27).

* * * * *